3,376,228
ETCHING COMPOSITION AND METHOD

John Ruzicka, Brooklyn, N.Y., assignor to Ball Brothers Company, Inc., Muncie, Ind., a corporation of Indiana No Drawing. Continuation of application Ser. No. 200,320, June 6, 1962. This application May 19, 1965, Ser. No. 457,206
13 Claims. (Cl. 252—79.4)

This is a continuation of application Ser. No. 200,320, filed June 6, 1962, now abandoned.

This invention relates to an etching composition and method, and, more particularly, to a composition particularly suited for use in the powderless etching of printing plates and to a method for powderless etching which includes the use of such composition.

The powderless etching of printing plates is a comparatively new development, being disclosed in considerable detail in U.S. Patents 2,640,763 through 2,640,767, inclusive, all issued on June 2, 1953. Further details of powderless etching are disclosed in U.S. Patents 2,763,536 and 2,828,194, the latter of which deals with the use of sulfated castor oils as surfactants or surface-active agents which constitute an essential constituent of compositions suitable for powderless etching. The instant invention is, in essence, an improvement over the disclosure of U.S. Patent 2,828,194, dealing also with compositions which include a sulfated castor oil as a surfactant.

By way of introduction to the instant invention, the primary distinction between what has been denominated "powderless etching" and what may be denominated "conventional etching" will be made. In conventional etching, a suitable etchant, e.g. a solution of nitric acid, is merely splashed against a suitable metal plate which carries an acid resistant material on portions which are not to be etched. The nitric acid, or the like, attacks exposed portions of the plate, causing etching thereof. Splashing of the nitric acid or the like against the plate is continued until such time as lateral attack of the nitric acid under the coated portions of the plate beings to occur. Etching is then discontinued, and the partially etched plate is "powdered," or treated with dragon's blood or the like in such a manner as to interfere with further lateral attack. Etching is then resumed until lateral attack once more becomes a problem. The procedures of powdering and etching are continued until the requisite depth of etching has been accomplished. By the powderless etching techniques of the above-identified patents, an etching bath comprising an etchant such as nitric acid, an organic material such as diethyl benzene, and a surface-active agent such as a dioctyl sulfosuccinate, a sulfated castor oil or the like is employed. Basically, such a composition is advantageous because, if properly balanced, it has a far lesser tendency toward lateral attack under protective coatings on a printing plate, so that the need for "powdering" is drastically reduced, or, under optmium conditions as to bath identity and operation, eliminated altogether. With powderless etching compositions that were known prior to the instant invention, however, have not been entirely satisfactory because, even with the best compositions and etching procedures, the etched plates produced were neither as smooth[1] nor as "tight"[2] as desired. Stability of the bath, control of tone depth during etching, and smoothness and cleanness of the etching operation itself have also constituted major problems, as has achieving the requisite balance[3] within the etching bath itself between the aqueous phase and the organic phase by virtue of the surfactant.

Tight etching is desirable to minimize distortion during ultimate printing. Some ink is deposited on the sidewalls of an etched plate during printing, and is transferred from the sidewalls to the paper. Since the desired printed image is that represented by the ink on the unetched printing surface only, any ink from the sidewalls distorts the desired printed image. Both the amount of ink deposited on the sidewalls and the extent of distortion increase as the angle of the sidewall relative to the unetched surface increases beyond 90°.

For example, the distortion and enlargement of a printed image from a plate with a sidewall angle of 135° is about six times as great as from a plate with a sidewall angle of 100°.

Although it is possible to decrease the angle of sidewall taper by increasing the speed of rotation of paddles which splash the acid against the plate, this is accompanied by a decrease in smoothness which is objectionable.

Smooth etched sidewalls are desirable, particularly in the manufacture of duplicate plates from an original etched plate.

The usual method of making duplicate plates is first to make a mold which is a negative image of the etched plate, and then from this mold to cast a duplicate of the etched plate. For greatest precision, a sheet of mold material is placed in contact with the etched surface, and is subjected to enough heat and pressure to force it into intimate contact with all etched and unetched areas of the plate to be duplicated. The mold material flows into the crevices and irregularities of the sidewalls of the etched plate, so that all irregularities of the sidewalls are duplicated on the corresponding surfaces of the mold. When the mold is separated from the etched plate, any sidewall roughness causes damage to the mold. The finer the detail on the image, the less it can tolerate damage resulting from the roughness of the etched sidewall. Any improvement in smoothness of the sidewall decreases the danger of damage to the mold during separation.

The instant invention is based upon the discovery of an etchant composition comprising an aqueous nitric acid phase as the etchant, at least one surfactant and a particular solvent composition to improve both smoothness and tightness of etching. The composition is also at least comparable with previously known materials with respect to stability and in control of tone depth.

It is, therefore, an object of the invention to provide an improved etching composition for use in the so-called powderless etching method.

It is a further object of the invention to provide an improved etching method which includes the use of the composition according to the invention.

Other objects and advantages will be apparent from the description which follows, which is intended only to illustrate and disclose, and in no way to limit the invention.

The instant invention will be more fully understood by those skilled in the art by reference to Examples 1, 2 and 3, below. In these examples, as elsewhere herein, including the appended claims, the terms "parts" and "percent" are used to refer to parts and percent by weight, unless otherwise indicated.

[1] The "smoothness" of an etch, as the term is used in the art, refers to the sidewall that is exposed by the etching action.

[2] The "tightness" of an etch refers to the sidewall that is exposed by the etching action. A "tight" etch is one where this wall is substantially at a right angle to the unetched plate surface, e.g., deviating by not more than about 10°. A "broad" etch is the opposite of a "tight" etch. Previously known baths have produced broad etches where the sidewalls have deviated from a right angle by as much as 45°.

[3] When a printing plate including both line work and halftone areas is etched, a "balanced" bath etches the halftone areas without undercutting the line work.

Example 1

A first preferred etching composition according to the invention was prepared by mixing 13½ parts by volume of 42° Baumé nitric acid, 3.6 parts by volume of a "Composition A" (prepared as hereinafter described in detail) and sufficient water to produce a total of 100 parts by volume. The resulting etching composition was used in a manner which was conventional, except for the identity of the composition, to etch exposed portions of zinc plates, parts of which were covered by an acid resistant coating. The zinc plates etched were substantially completely free of lead, cadmium and iron, and contained 0.1 percent of aluminum and 0.05 percent of magnesium. When used for etching, as indicated, the etching composition was found to cause a smoother and cleaner etch than did previously known etching compositions.

Composition A was prepared by mixing at room temperature of about 70° F., for about 5 minutes, 20.5 parts of Sulfated Castor Oil No. 1,[4] 10.5 parts of Sulfated Castor Oil No. 2,[5] 68.65 parts of a solvent,[6] and 0.35 part of dodecyl benzene sulfonic acid.[7]

Example 2

The procedure described in the first paragraph of Example 1 has also been repeated except that Composition B (3.6 parts) was substituted for the 3.6 parts of Composition A. The improvement noted in the first paragraph of Example 1 was observed, and, in addition, the etching composition was found to enable better control by the operator over tone depth achieved during etching. The composition also was found to have greater stability, particularly under those conditions of intermittent use of the etching bath which have been found to promote instability.

Composition B was prepared in the manner described in the second paragraph of Example 1, from 14.25 parts of Sulfated Castor Oil No. 1, 16.6 parts of Sulfated Castor Oil No. 2, 67.35 parts of the solvent identified in Example 1, 0.9 part of the sodium salt of the oleic acid amide of methyl taurine [8] and 0.9 part of the sodium salt of an ethoxylated and then carboxylated tridecyl alcohol.[9]

Example 3

The procedure described in the first paragraph of Example 1 has also been repeated except that a Composition C (3.6 parts) was employed instead of the 3.6 parts of Composition A. The unexpected advantages to which reference was made in Examples 1 and 2 were observed, and, in addition, what is known in the trade as "tighter" etching was achieved, and the first plate etched using a fresh bath containing Composition C was found to etch appreciably cleaner than the first plate etched using Composition A or B.

Composition C was prepared from 4.65 parts of Sulfated Castor Oil No. 1, 27.5 parts of Sulfated Castor Oil No. 2, 64.7 parts of a solvent composition B,[10] 1.35 parts of the previously identified sodium salt of the oleic acid amide of methyl taurine and 0.8 part of the previously identified sodium salt of an ethoxylated and then carboxylated tridecyl alcohol and 1 part of oleic acid.

It will be apparent from the foregoing detailed discussion that considerable latitude is available in practicing the instant invention. For example, Sulfated Castor Oil No. 1 can constitute from about 4 percent to about 24 percent of the composition which is mixed with nitric acid and water to provide an etching bath, while Sulfated Castor Oil No. 2 can constitute from about 28 percent to about 8 percent. Preferably, Sulfated Castor Oil No. 1 constitutes from 9 percent to 22 percent and Sulfated Castor Oil No. 2 constitutes from 22 percent to 9 percent of the indicated composition. Excellent results have also been achieved when various surface-active agents were used in place of the sodium salt of a methyl taurine amide; for example surfactants similar in chemical structure, including both amides and esters, have been employed, in the quantities indicated in the following table, with substantially the previously reported results:

TABLE I

| Identity of Surfactant Employed | Number of Parts Thereof Substituted in the Example 2 Procedure |
|---|---|
| Sodium N-methyl-N-"tallow acid" taurate (commercially available under the designation "Igepon TE 42") | 2.5 |
| Sodium N-methyl-N-"coconut oil acid" taurate (commercially available under the designation "Igepon TC 42") | 2.5 |
| Sodium N-methyl-N-palmitoyl taurate (commercially available under the designation "Igepon TN 74") | 0.7 |
| Sodium N-cyclohexyl-N-palmitoyl taurate (commercially available under the designation "Igepon CN 42") | 0.7 |
| Coconut acid ester of sodium isethionate (commercially available under the designation "Igepon AC 78") | 0.8 |

It will be observed from the foregoing examples that considerable latitude is possible relative to the specific identity of the solvent or solvent system employed in a composition according to the invention. For example, the aromatic solvents employed in the procedures of Examples 1, 2 and 3 all included about 7 percent of aliphatic materials, so that the hydrocarbon portions of the solvents were substantially aromatic. The aliphatic solvent that was blended with butyl Cellosolve and the aromatic material in the Example 3 procedure, however, reduced the aromatic content of the overall hydrocarbon portion of the solvent composition to about 50 percent. Excellent etching results have also been achieved, using the hydrocarbon portion of the solvents of Example 3 in different proportions, the aromatic content ranging as low as about 30 percent thereof. It has been found that some aromatic is required in the solvent in order to achieve optimum

---

[4] Sulfate Castor Oil No. 1 can be purchased commercially, manufactured to the following specifications: combined $SO_3$ 5.8 to 6.5 percent, free fatty acid (calculated as oleic acid) 12 to 21 percent, alkalinity as NaOH 1.0 to 2.3 percent, moisture 21 to 26 percent, total fatty matter 62 to 68 percent, pH 6.0 to 8.0.

[5] Sulfated Castor Oil No. 2 can be purchased commercially from the following specifications: combined $SO_3$ 4.9 to 5.5 percent, free fatty acid (calculated as oleic acid) 18 to 25 percent, alkalinity as NaOH 1.0 to 2.3 percent, moisture 21 to 26 percent, total fatty matter 62 to 68 percent, pH 6.0 to 8.0.

[6] The particular material used was a blend of equal parts by volume of butyl Cellosolve and in aromatic hydrocarbon petroleum solvent having an A.P.I. gravity at 60° F. of 26.9, a specific gravity at 60° F. of 0.893, a Tag closed cup flash point of 150° F., a mixed aniline cloud point of 69° F. and the following distillation characteristics:

| | ° F. |
|---|---|
| I.B.P. | 367 |
| 50 percent | 378 |
| Dry end point | 418 |

[7] Substantially identical results have been achieved using commercially available sodium decyl benzene sulfonate, and sodium dodecyl benzene sulfonate.

[8] Excellent results have been achieved using the particular salt which is available under the trade name "Igepon T–77."

[9] Excellent results have been achieved using the particular sodium salt which is available under the trade name "Sandopan DTC."

[10] Solvent Composition B was a blend of 100 parts of butyl Cellosolve, 45 parts of an aliphatic hydrocarbon petroleum solvent and 55 parts of an aromatic hydrocarbon petroleum solvent. The aromatic solvent had a specific gravity at 60° F. of 1.012, a Tag open cup flash point of 220° F., a mixed aniline cloud point of 54° F. and the following distillation characteristics:

| | ° F. |
|---|---|
| I.B.P. | 480 |
| 10 percent | 495 |
| Dry end point | 580 |

The aliphatic solvent was one having an A.P.I. gravity at 60° F. of 41.5, a specific gravity at 60° F. of 0.8179, a Tag closed cup flash point of 145° F., an aniline cloud point of 133.5° F. and the following distillation characteristics:

| | ° F. |
|---|---|
| I.B.P. | 368 |
| 50 percent | 399 |
| Dry end point | 451 |

etching results. As a consequence, it is ordinarily preferred not to blend aliphatic solvents to such an extent that the aromatic portion of the hydrocarbon part of the solvent system is reduced to less than about 20 percent. For practical reasons, it is also preferred to employ solvent compositions that have relatively high flash points and that are relatively nonvolatile. Ideally, a solvent or solvent composition should have a Tag closed cup flash point of at least 135° F., and a dry end point of at least about 400° F.

Extremely smooth and tight etching is achieved with the solvent compositions identified in the preceding Examples, because of the presence therein of butyl Cellosolve. It has been found that smooth etching can also be achieved when other similar materials are substituted for the butyl Cellosolve, in whole or in part, on a volume basis. Specifically, such similar materials are represented by the general formulas $$RO—(C_2H_4O—)_nR'$$
$$RO—(C_3H_6O—)_{n'}R'$$

wherein R and R′ can be the same or different, and each is hydrogen or an alkyl radical having from 1 to 6 carbon atoms, *n* is from 1 to 450, and *n′* is 1 to 35.

Such materials are ethylene and propylene glycols, polyethylene and polypropylene glycols containing, respectively, 2 to 450 ethylene groups and 2 to 35 propylene groups, monoalkyl ethers of ethylene and propylene glycols wherein the alkyl group contains from 1 to 6 carbon atoms, monoalkyl ethers of the polyethylene and polypropylene glycols wherein the alkyl group contains from 1 to 6 carbon atoms, dialkyl ethers of ethylene and propylene glycols wherein the alkyl groups contain from 1 to 6 carbon atoms and dialkyl ethers of the polyethylene and polypropylene glycols wherein the alkyl groups contain from 1 to 6 carbon atoms.

Under most circumstances, it is preferred that one or more of the indicated ethers or glycols constitute from about 40 percent to about 60 percent by volume of the solvent composition, and that from about 65 percent to about 85 percent of the entire composition (other than acid and water) is solvent. In such case, satisfactory results can also be achieved when the composition to which nitric acid and water are added to prepare the etching bath consists of the indicated percentages of the solvent, and at least one of the two sulfated castor oils. However, preferred compositions include the other bath ingredients of the previously identified compositions. Substantially identical results can be achieved using the mix described above in Example 2, or using a mix prepared as described above from 500 grams of Sulfated Castor Oil No. 1, 800 grams of Sulfated Castor Oil No. 2, 17½ grams of the sodium salt of an ethoxylated and then carboxylated tridecyl alcohol which is available under the trade name "Sandopan DTC," 110 grams of the sodium salt of the oleic acid amide of methyl taurine which is commercially available under the trade name "Igepon T–33," 45 grams of oleic acid, 1670 milliliters of the aromatic hydrocarbon petroleum solvent identified in Example 1, 1520 milliliters of butyl carbitol (monobutyl ether of di-ethylene glycol), 16½ liters of 42° Baumé nitric acid, and sufficient water to make a total of 120 liters.

The improvement in smoothness of etch using compositions according to the invention can readily be detected by visual observation, using a low power glass. The improvement in tightness has been demonstrated by comparison with a bath produced as described above, but substituting for Composition A an additive that is in wide commercial use in this country, and sold under the designation "Micro-Mix D.E." Using the resulting etching bath, the minimum interior angle between sidewalls and unetched portions of the plate could be achieved, without sacrifice to sidewall smoothness, was 120°. When, however, an additive according to the invention, and prepared from 375 grams of Castor Oil No. 1, 440 grams of Castor Oil No. 2, 105 grams of the sodium salt of the oleic acid amide of methyl taurine which is commercially available under the trade name "Igepon T–33," 25 milliliters of an alkyl aryl sulfonic acid, 30 milliliters of oleic acid, 1500 milliliters of the aromatic hydrocarbon petroleum solvent identified in Example 1 and 1840 milliliters of butyl Cellosolve, was used as described above in place of Composition A, an interior angle between unetched plate portions and sidewalls as low as about 110° was accomplished with no sacrifice to smoothness, and an angle as low as about 100° was accomplished with smoothness comparable to the best achieved with the "Micro-Mix D.E." material. Further examples of compositions which can be substituted for the 3.6 parts by volume of Composition A to achieve smoother etching by the procedure of the first paragraph of Example 1 are set forth in Table II, below:

TABLE II

| Composition No. | Sulfated Castor Oil No. 1 (grams) | Sulfated Castor Oil No. 2 (grams) | Oleic Acid (ml.) | Dodecylbenzenesulfonic acid (ml.) | Sodium N-methyl-N-oleoyl taurate [1] (grams) | Carboxylated tridecyl alcohol (grams) | Aromatic hydrocarbon petroleum solvent [2] (ml.) | Aliphatic hydrocarbon petroleum solvent [3] (ml.) | Ethylene glycol monobutyl ether (ml.) | Ethylene glycol monohexyl ether (ml.) |
|---|---|---|---|---|---|---|---|---|---|---|
| 1 | 625 | 350 | 75 | ---- | 35 | 75 | 2,100 | 250 | 1,000 | 125 |
| 2 | 625 | 350 | 75 | ---- | 35 | 75 | 2,100 | 250 | 1,400 | 125 |
| 3 | 500 | 800 | 50 | ---- | 110 | 35 | 2,280 | ---- | 2,280 | ---- |
| 4 | 500 | 800 | 50 | ---- | 110 | 35 | 1,610 | ---- | 2,430 | ---- |
| 5 | ---- | 975 | 75 | ---- | 35 | 75 | 300 | 800 | 1,275 | ---- |
| 6 | 305 | 355 | 68 | ---- | 51 | ---- | 850 | ---- | 1,800 | ---- |
| 7 | 305 | 355 | 68 | ---- | 51 | ---- | 850 | ---- | 2,100 | ---- |
| 8 | 450 | 525 | 100 | 60 | ---- | 50 | 1,300 | ---- | 1,100 | ---- |
| 9 | 450 | 525 | 100 | ---- | ---- | 50 | 1,300 | ---- | 1,500 | ---- |
| 10 | 525 | 450 | ---- | ---- | ---- | ---- | 1,000 | ---- | 1,100 | ---- |
| 11 | 525 | 450 | ---- | ---- | ---- | ---- | 1,500 | ---- | 1,500 | ---- |
| 12 | 525 | 450 | ---- | ---- | ---- | ---- | 2,000 | ---- | 2,000 | ---- |

[1] Excellent results have been achieved using the particular salt which is available under the trade name "Igepon T–33."

[2] The particular aromatic hydrocarbon petroleum solvent had an A.P.I. gravity at 60° F. of 26.9, a specific gravity at 60° F. of 0.893, a Tag closed cup flash point of 150° F., a mixed aniline cloud point of 869° F. and the following distillation characteristics:

| | ° F. |
|---|---|
| I.B.P | 367 |
| 50 percent | 378 |
| Dry end point | 418 |

[3] The particular aliphatic hydrocarbon petroleum solvent had an A.P.I. gravity at 60° F. of 41.5, a specific gravity at 60° F. of 0.8179, a Tag closed cup flash point of 145° F., an aniline cloud point of 133.5° F. and the following distillation characteristics:

| | ° F. |
|---|---|
| I.B.P | 368 |
| 50 percent | 399 |
| Dry end point | 451 |

It has been found that in different etching machines, due to differences in design and detail of construction the proportions of nitric acid and water used in producing an etching bath according to the invention can vary within relatively broad limits. For example, nitric acid can constitute from about 11.2 percent to about 16 percent of the entire composition, and water can constitute from about 85.2 percent to about 80.4 percent. In most machines, best results are obtained when nitric acid constitutes from about 12 percent to about 14.5 percent. It is also preferred that water constitute from about 84.4 percent to about 81.9 percent. The remainder of the etching bath, from about 1.4 percent to about 6 percent, is composed of a composition according to the invention as defined below:

| | Range, percent |
|---|---|
| Sulfated Castor Oil [1] | 35–15 |
| Solvent [2] | 65–85 |

[1] The sulfated castor oil must have the following average properties:

| | Percent |
|---|---|
| Combined $SO_3$ content | 4.9–6.5 |
| Free fatty acid calculated as oleic acid | 12–25 |
| Alkalinity calculated as NaOH | 1.0–2.3 |
| Moisture | 21–26 |
| Total fatty matter | 62–68 |
| pH, 6–8. | |

[2] The solvent must include from about 40 percent to about 60 percent by volume of a material having one of the general formulas RO—$(C_2H_4O—)_nR'$ and RO—$(C_3H_6—)_{n'}R'$ where R, R', n, and n' have the meanings set forth above. Preferably, at least about 20 percent of the remainder of the solvent is aromatic, and up to 80 percent thereof can be aliphatic. Ideally, as discussed above, the solvent composition should have a Tag closed cup flash point of at least 135° F., and a dry end point of at least about 400° F.

Optimum results have been achieved when the glycol or ether has constituted from about 45 percent to about 55 percent by volume of the solvent composition, and when the sulfated castor oil has been a blend of from 10 to 75 percent of Sulfated Castor Oil No. 1 with from 90 to 25 percent of Sulfated Castor Oil No. 2. Optimum results have also been achieved when the composition has included from 0.3 to 2 percent of at least one surface active agent selected from the group consisting of alkyl aryl sulfonates, sodium N-methyl-N-"tallow acid" taurate, sodium, N-methyl-N-"coconut oil acid" taurate, sodium N-methyl-N-palmitoyl taurate, sodium N-cyclohexyl N-palmitoyl taurate, coconut acid ester of sodium isethionate and sodium N-methyl-N-oleoyl taurate. Because of commercial availability, the ethylene glycol monoethers of methyl alcohol, ethyl alcohol, butyl alcohols and hexyl alcohols are preferred constituents of the compositions. Best results to date have been achieved when the solvent composition has been a blend of the aromatic and aliphatic hydrocarbon solvents and of two different ethylene glycol monoethers as indicated below in parts by volume:

| | Range | Optimum |
|---|---|---|
| Aromatic hydrocarbon solvent | 1,000–3,000 | 2,000 |
| Aliphatic hydrocarbon solvent | 250–750 | 500 |
| Ethylene glycol monoether of butyl alcohols | 1,000–2,500 | 2,000 |
| Ethylene glycol monoether of hexyl alcohols | 25–300 | 100 |

The method for etching according to the instant invention is conventional except for the identity of the etching bath employed. A suitable plate with portions exposed and other portions suitably protected is positioned appropriately and an etching composition according to the invention is brought into contact with the surfaces thereof. The protective coating on portions of the plate which are not to be etched can be provided in a conventional manner, for example by exposing a light sensitized polyvinyl alcohol coating to light through a suitable negative so that portions of the coating which are to remain on the plate during etching to provide protection are exposed to light in a desired pattern. Remaining portions of the coating, i.e. unexposed portions, are then washed from the plate, after which the previously exposed portions are suitably hardened, for example by heat. In addition to zinc printing plates as previously identified in considerable detail, other plates can be etched using the compositions and method according to the instant invention. Examples of such plates are as follows:

0 to 0.5 percent aluminum
0 to 0.15 percent magnesium
0 to 0.01 percent iron
Balance zinc
Substantially free from lead and cadmium Common metallurgical knowledge of zinc-base alloys would suggest other alloying ingredients which might be added to zinc, with or without the above alloy ingredients, without materially affecting etching results.

It will be apparent that various changes and modifications can be made from the specific details set forth herein without departing from the spirit and scope of the invention as defined in the appended claims.

What I claim is:

1. An etchant composition consisting essentially of from about 11.2 percent to about 16 percent of nitric acid, from about 85.2 percent to about 80.4 percent of water, and from about 1.4 percent to about 6 percent of a composition which consists essentially of from 4 percent to 24 percent by weight of a sulfated castor oil having a combined $SO_3$ content of from 5.8 percent to 6.5 percent, free fatty acid calculated as oleic acid, of from 12 percent to 21 percent, alkalinity as NaOH from 1.0 percent to 2.3 percent, moisture from 21 percent to 26 percent, total fatty matter 62 percent to 68 percent, and a pH from 6 to 8, from 28 percent to 8 percent by weight of a second sulfated castor oil having a combined $SO_3$ content of from 4.9 percent to 5.5 percent, free fatty acid calculated as oleic acid, of from 18 percent to 25 percent, alkalinity as NaOH from 1.0 percent to 2.3 percent, moisture from 21 percent to 26 percent, total fatty matter 62 percent to 68 percent, and a pH of from 6 to 8, from 65 percent to 85 percent of a solvent wherein from 40 percent by volume to 60 percent by volume is an ethylene glycol monoalkyl ether wherein the alkyl group has from 1 to 6 carbon atoms, and the remainder is hydrocarbon petroleum solvent having a Tag closed cup flash point of at least 135° F. at least 20 percent of which is aromatic, and from 0.3 percent to 2 percent of a surface-active agent selected from the group consisting of an alkyl benzene sulfonate wherein the alkyl portion contains 10 to 12 carbon atoms, sodium N-methyl-N-oleoyl taurate, sodium N-methyl-N-tallow acid taurate, sodium N-methyl-N-coconut oil acid taurate, sodium N-methyl-N-palmitoyl taurate, sodium N-cyclohexyl-N-palmitoyl taurate and coconut acid ester of sodium isethionate.

2. A composition for use with an acid etchant for improved powderless etching, said composition consisting essentially of (1) from 15 to 35 percent by weight of a sulfated castor oil having the following average properties:

| | Percent |
|---|---|
| Combined $SO_3$ content | 4.9–6.5 |
| Free fatty acid calculated as oleic acid | 12–25 |
| Alkalinity calculated as NaOH | 1.0–2.3 |
| Moisture | 21–26 |
| Total fatty matter | 62–68 |
| pH, 6–8 | |

and (2) from 85 to 65 percent of a solvent composition, said solvent composition including a hydrocarbon petroleum solvent having a Tag closed cup flash point of at least 135° F., at least 20 percent of which is aromatic and an amount sufficient to provide, when used with an acid etchant in powderless etching, substantial improvement in smoothness and tightness of etching of a member of the group having the formulas RO—$(C_2H_4O—)_nR'$ and RO—$(C_3H_6O—)_{n'}R'$, in which R and R' are members of the group consisting of hydrogen and alkyl radicals having from 1 to 6 carbon atoms, $n$ is from 1 to 450 and $n'$ is from 1 to 35.

3. The composition of claim 2 which additionally comprises from 0.3 percent to 2 percent of a surface active agent selected from the group consisting of an alkyl benzene sulfonate wherein the alkyl portion contains from 10 to 12 carbon atoms, sodium N-methyl-N-oleoyl taurate, sodium N-methyl-N-tallow acid taurate, sodium N-methyl-N-coconut oil acid taurate, sodium N-methyl-N-palmitoyl taurate, sodium N-cyclohexyl-N-palmitoyl taurate and coconut acid ester of sodium isethionate.

4. A composition for use with an acid etchant for improved powderless etching, said composition consisting essentially of (1) from 15 to 35 percent by weight of a sulfated castor oil having the following average properties:

| | Percent |
|---|---|
| Combined $SO_3$ content | 4.9–6.5 |
| Free fatty acid calculated as oleic acid | 12–25 |
| Alkalinity calculated as NaOH | 1.0–2.3 |
| Moisture | 21–26 |
| Total fatty matter | 62–68 |
| pH, 6–8 | |

and (2) from 85 to 65 percent of a solvent composition, said solvent composition including a hydrocarbon petroleum solvent having a Tag closed cup flash point of at least 135° F. at least 20 percent of which is aromatic and an amount sufficient to provide, when used with an acid etchant in powderless etching, substantial improvement in smoothness and tightness of etching, of a monoalkyl ether of ethylene glycol wherein the alkyl group has from 1 to 6 carbon atoms.

5. The composition of claim 4 which additionally comprises from 0.3 percent to 2 percent of a surface active agent selected from the group consisting of an alkyl benzene sulfonate wherein the alkyl portion contains from 10 to 12 carbon atoms, sodium N-methyl-N-oleoyl taurate, sodium N-methyl-N-tallow acid taurate, sodium N-methyl-N-coconut oil acid taurate, sodium N-methyl-N-palmitoyl taurate, sodium N-cyclohexyl-N-palmitoyl taurate and coconut acid ester of sodium isethionate.

6. A composition for use with an acid etchant for improved powderless etching, said composition consisting essentially of (1) from 15 to 35 percent by weight of a sulfated castor oil having the following average properties:

| | Percent |
|---|---|
| Combined $SO_3$ content | 4.9–6.5 |
| Free fatty acid calculated as oleic acid | 12–25 |
| Alkalinity calculated as NaOH | 1.0–2.3 |
| Moisture | 21–26 |
| Total fatty matter | 62–68 |
| pH, 6–8 | |

and (2) from 85 to 65 percent of a solvent composition, said solvent composition including a hydrocarbon petroleum solvent having a Tag closed cup flash point of at least 135° F. at least 20 percent of which is aromatic and an amount sufficient to provide, when used with an acid etchant in powderless etching, substantial improvement in smoothness and tightness of etching, of a monoalkyl ether of a polyethylene glycol wherein the alkyl group has from 1 to 6 carbon atoms and having 2 to 450 ethylene groups.

7. The composition of claim 6 which additionally comprises from 0.3 percent to 2 percent of a surface active agent selected from the group consisting of an alkyl benzene sulfonate wherein the alkyl portion contains from 10 to 12 carbon atoms, sodium N-methyl-N-oleoyl taurate, sodium N-methyl-N-tallow acid taurate, sodium N-methyl-N-coconut oil acid taurate, sodium N-methyl-N-palmitoyl taurate, sodium N-cyclohexyl-N-palmitoyl taurate and coconut acid ester of sodium isethionate.

8. A composition for use with an acid etchant for improved powderless etching, said composition consisting essentially of (1) from 15 to 35 percent by weight of a sulfated castor oil having the following average properties:

| | Percent |
|---|---|
| Combined $SO_3$ content | 4.9–6.5 |
| Free fatty acid calculated as oleic acid | 12–25 |
| Alkalinity calculated as NaOH | 1.0–2.3 |
| Moisture | 21–26 |
| Total fatty matter | 62–68 |
| pH, 6–8 | |

and (2) from 85 to 65 percent of a solvent composition, said solvent composition including a hydrocarbon petroleum solvent having a Tag closed cup flash point of at least 135° F. at least 20 percent of which is aromatic and an amount sufficient to provide, when used with an acid etchant in powderless etching, substantial improvement in smoothness and tightness of etching, of a monobutyl ether of ethylene glycol.

9. The composition of claim 8 which additionally comprises from 0.3 percent to 2 percent of a surface active agent selected from the group consisting of an alkyl benzene sulfonate wherein the alkyl portion contains from 10 to 12 carbon atoms, sodium N-methyl-N-oleoyl taurate, sodium N-methyl-N-tallow acid taurate, sodium N-methyl-N-coconut oil acid taurate, sodium N-methyl-N-palmitoyl taurate, sodium N-cyclohexyl-N- palmitoyl taurate and coconut acid ester of sodium isethionate.

10. A composition for use with an acid etchant for improved powderless etching, said composition consisting essentially of (1) from 15 to 35 percent by weight of a sulfated castor oil having the following average properties:

| | Percent |
|---|---|
| Combined $SO_3$ content | 4.9–6.5 |
| Free fatty acid calculated as oleic acid | 12–25 |
| Alkalinity calculated as NaOH | 1.0–2.3 |
| Moisture | 21–26 |
| Total fatty matter | 62–68 |
| pH, 6–8 | |

and (2) from 85 to 65 percent of a solvent composition, said solvent composition including a hydrocarbon petroleum solvent having a Tag closed cup flash point of at least 135° F., at least 20 percent of which is aromatic and an amount sufficient to provide, when used with an acid etchant in powderless etching, substantial improvement in smoothness and tightness of etching, of a monoalkyl ether of propylene glycol wherein the alkyl group has from 1 to 6 carbon atoms.

11. The composition of claim 10 which additionally comprises from 0.3 percent to 2 percent of a surface active agent selected from the group consisting of an alkyl benzene sulfonate wherein the alkyl portion contains from 10 to 12 carbon atoms, sodium N-methyl-N-oleoyl taurate, sodium N-methyl-N-tallow acid taurate, sodium N-methyl-N-coconut oil acid taurate, sodium N-methyl-N-palmitoyl taurate, sodium N-cyclohexyl-N-palmitoyl taurate and coconut acid ester of sodium isethionate.

12. A composition for use with an acid etchant for improved powderless etching, said composition consisting essentially of (1) from 15 to 35 percent by weight of a sulfated castor oil having the following average properties:

| | Percent |
|---|---|
| Combined $SO_3$ content | 4.9–6.5 |
| Free fatty acid calculated as oleic acid | 12–25 |
| Alkalinity calculated as NaOH | 1.0–2.3 |
| Moisture | 21–26 |
| Total fatty matter | 62–68 |
| pH, 6–8 | |

and (2) from 85 to 65 percent of a solvent composition, said solvent composition including a hydrocarbon petroleum solvent having a Tag closed cup flash point of at least 135° F. at least 20 percent of which is aromatic and an amount sufficient to provide, when used with an acid etchant in powderless etching, substantial improvement in smoothness and tightness of etching, of a polypropylene glycol having 2 to 35 propylene groups.

13. The composition of claim 12 which additionally comprises from 0.3 percent to 2 percent of a surface active agent selected from the group consisting of an alkyl benzene sulfonate wherein the alkyl portion contains from 10 to 12 carbon atoms, sodium N-methyl-N-oleoyl taurate, sodium N-methyl-N-tallow acid taurate, sodium N-methyl-N-coconut oil acid taurate, sodium N-methyl-N-palmitoyl taurate, sodium N-cyclohexyl-N-palmitoyl taurate and coconut acid ester of sodium isethionate.

References Cited

UNITED STATES PATENTS

| | | | |
|---|---|---|---|
| 2,828,194 | 3/1958 | Hopkins et al. | 252—79.2 X |
| 2,846,295 | 8/1958 | Patterson et al. | 252—79.4 |
| 2,979,387 | 4/1961 | Easley et al. | 252—79.4 X |
| 3,074,836 | 1/1963 | Sherer et al. | 252—79.4 X |
| 3,136,671 | 6/1964 | Martz et al. | 156—14 |
| 3,147,224 | 9/1964 | Gauntt et al. | 152—143 |

LEON D. ROSDOL, *Primary Examiner.*

M. WEINBLATT, *Assistant Examiner.*